April 23, 1935.  G. E. HUGHES  1,999,099
MOTOR VEHICLE JACK
Filed Sept. 6, 1934
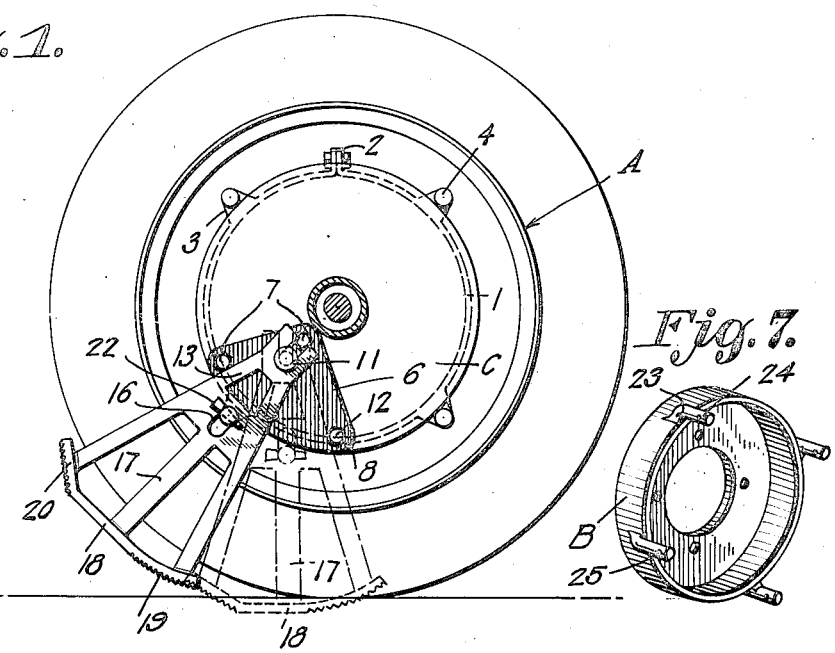
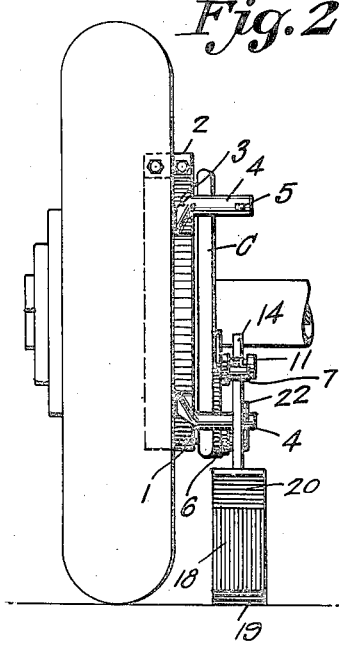
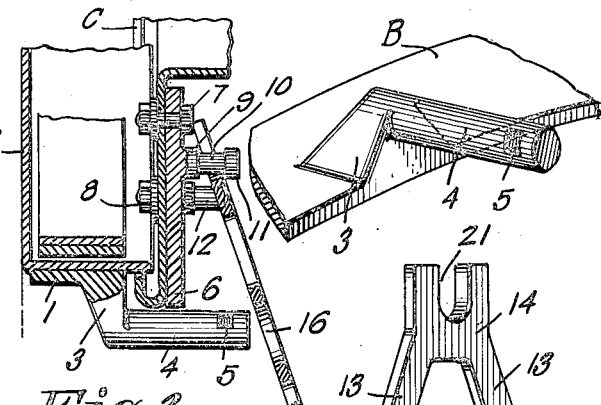
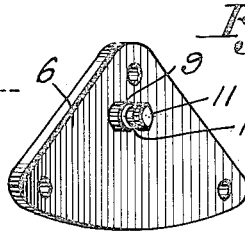
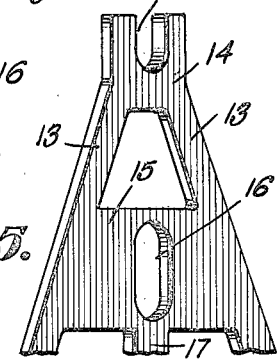
G. E. Hughes,
INVENTOR
BY Victor J. Evans & Co.
ATTORNEY Patented Apr. 23, 1935

1,999,099

UNITED STATES PATENT OFFICE 1,999,099

MOTOR VEHICLE JACK

George E. Hughes, Edgewater, Colo.

Application September 6, 1934, Serial No. 742,957

6 Claims. (Cl. 254—94)

This invention relates to lifting jacks for motor vehicle wheels and its general object is to provide a jack that is primarily designed to be attached to the vehicle for cooperation with the propelling means thereof for moving the vehicle thereby to elevate any one of the wheels to a height so that its tire can be changed or to perform other work with respect thereto.

A further object of the invention is to provide a lifting jack for vehicle wheels, that requires very little labor on the part of the operator, as after the lifting device is disposed in position for use, the vehicle is moved to perform the lifting operation, therefore it will be obvious that the wheel can be elevated in an easy and expeditious manner with very little effort.

Another object of the invention is to provide a lifting jack of the character set forth, that is simple in construction, easy to apply to any type of motor vehicle wheel, is inexpensive to manufacture and extremely efficient in operation and service.

This invention also consists in certain other features of construction and in the combination and arrangement of the several parts, to be hereinafter fully described, illustrated in the accompanying drawing and specifically pointed out in the appended claims.

In describing my invention in detail, reference will be had to the accompanying drawing wherein like characters denote like or corresponding parts throughout the several views, and in which:

Figure 1 is a sectional view taken through a rear axle housing of a motor vehicle and shows the application of the jack which forms the subject matter of the present invention to the brake drum and housing of one of the rear wheels with the lifting member in full lines just prior to being moved to operative position, and in dotted lines when in the latter position.

Figure 2 is a view taken at right angles to Figure 1, looking toward the left thereof.

Figure 3 is a fragmentary sectional view showing the manner of applying the lifting member.

Figure 4 is a fragmentary perspective view showing a portion of the drum receiving band and a lug thereof.

Figure 5 is a fragmentary perspective view of the lifting member.

Figure 6 is a perspective view of the brake housing receiving plate.

Figure 7 is a perspective view showing the lugs integrally secured to the brake drum.

Referring to the drawing in detail, the letter A indicates a rear wheel of a motor vehicle, B the brake drum thereof, and C the brake housing or closure plate for the drum. While I have illustrated my jack applied to the rear wheel, it will be obvious that it can also be applied to the front wheels.

The device which forms the subject matter of the present invention includes a collar 1 having apertured ears 2 formed on the ends thereof and disposed at right angles with respect thereto for the purpose of receiving bolt and nut connections for securing the collar about the brake drum as best shown in Figures 1 and 2, it being apparent that the collar is in the form of a band and can be readily attached to and removed from the drum.

Formed on and extending from the collar 1 are lugs 3 which includes inwardly directed fingers 4 having bores 5 transversely arranged therethrough adjacent the inner ends thereof as best shown in Figure 3 and for a purpose which will be presently apparent. The lugs are disposed at equi-distantly spaced intervals as clearly shown in Figure 1.

Secured to the closure plate C is a substantially triangular shape plate 6 having openings arranged adjacent to the corners thereof to receive the bolts of bolt and nut connections 7 and 8 for fixing the plate to the member C as best shown in Figure 2, and formed on the plate and inwardly extending therefrom is a stud 9 having a circumferential groove 10 providing a head 11 and it will be noted that the bolt of the bolt and nut connection 8 has an extension 12 formed thereon and extending inwardly therefrom to act as a stop for the lifting member which will now be described.

The lifting member is in the form of a frame of substantially triangular formation, in that it includes converging arms 13 that terminate at their upper ends into a fork 14 and bridging the arms is a web 15 having a slot 16 arranged vertically therein. The web has a center arm 17 extending therefrom and formed on the lower ends of the arms 13 and 17 is a foot piece 18 that is provided with serrated end portions 19 and 20, the latter being curved and disposed on the forward part of the foot piece while the former is inclined and arranged at the rear portion thereof.

It will be noted that the lifting member is detachably associated with respect to the plate 6, and when applying the lifting member thereto, it is disposed so that the recess 21 provided by the fork 14 receives the stud 9, in a manner whereby the groove thereof is disposed within the recess 21 as suggested in Figure 3. When so positioned, the lifting member is moved toward the plate 6 for disposing the adjacent finger within the slot 16, as best shown in Figure 2. A wedge 22 is then inserted in the bore 5, to hold the lifting member associated with the stud 9 and finger 4.

When the lifting member is arranged in operative position as above described, the vehicle is then moved rearwardly, and by its propelling means, if desired. Such movement will cause the serrated end portion 19 to grip the ground, and the wheel is moved until the forward arm 13 contacts the extension 12. Further movement of the vehicle will result in the wheel being elevated, as the lifting member will then assume the position as shown in dotted lines in Figure 1. By employing serrated portions on each end of the foot piece, it will be apparent that the lifting member is reversible and the serrated end portion 20 may be employed when the device is used with the front wheels of the vehicle.

In Figure 7, I have illustrated a slightly modified form which discloses the lugs 3 formed integral with the brake drum, and for distinction the lugs are indicated by the reference numeral 23 and have formed therewith fingers 24 which are likewise provided with bores 25.

The plate 6 may be formed on or integral with the member C, or the plate may be eliminated and the stud 9 and stop 12 formed integral with the member C, without departing from the spirit of the invention.

From the above description and disclosure in the drawing, it will be obvious that I have provided a lifting jack that is capable for use on any of the wheels of a motor vehicle to elevate the same in an easy and expeditious manner with very little effort on the part of the operator, as after the lifting member is disposed in position, movement of the vehicle will elevate the wheel for the purpose intended.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:

1. A lifting jack for a motor vehicle, comprising means carried by the brake housing of a wheel of the vehicle, means carried by the brake drum thereof, and lifting means cooperating with the housing and drum carried means to elevate the wheel upon movement of the vehicle.

2. A lifting jack for a motor vehicle, comprising means carried by the brake housing of a wheel of the vehicle, means carried by the brake drum of said wheel, a stud extending from the first mentioned means, and means detachably associated and pivotally mounted on the stud and received by the second mentioned means to elevate the vehicle wheel upon movement of the vehicle.

3. A lifting jack for a motor vehicle, comprising a plate secured to the brake housing of a wheel of the vehicle, lugs having connection with the brake drum, fingers extending from the lugs, lifting means detachably and pivotally associated with the stud and receiving any one of said fingers for cooperation therewith and the stud respectively to elevate the wheel upon movement of the vehicle.

4. A lifting jack for a motor vehicle, comprising a plate secured to the brake housing of a wheel of the vehicle, a stud formed on the plate and extending inwardly therefrom, lugs having connection with the brake drum of the wheel, fingers extending inwardly from the lugs, lifting means including a forked end detachably and pivotally associated with the stud, said lifting means having a slot arranged therein to receive one of the fingers, ground engaging means included in the lifting means, and the latter cooperating with the stud and finger to elevate the wheel upon movement of the vehicle.

5. A lifting jack for a motor vehicle, comprising a plate secured to the brake housing of a wheel of the vehicle, a stud extending inwardly from said plate and having a circumferential groove therein, a band secured about the brake drum of the wheel, lugs formed on the band, fingers formed on the lugs and extending inwardly therefrom, a lifting means, a fork formed on the lifting means to be received in the groove of the stud, said lifting means having a slot arranged therein to receive one of the fingers, means for securing the finger in the slot, said lifting means cooperating with the stud and finger to elevate the wheel upon movement of the vehicle, and means arranged in the path of the lifting means to act as a stop therefor.

6. A lifting jack for a motor vehicle comprising a plate secured to the brake housing of a wheel of the vehicle, a stud formed on and extending inwardly from the plate, lugs having connection with the brake drum of the wheel, fingers formed on the lugs and extending inwardly therefrom and having slots disposed in the free ends thereof, lifting means including diverging arms, a serrated foot piece secured to said arms at the lower end thereof, a fork at the upper ends of said arms for detachable and pivotal association with the stud, a web bridging the arms and having a slot arranged therein to receive one of the fingers, means received in the bore of the finger for securing the lifting means thereto, and said lifting means together with its serrated foot piece cooperating with the stud and finger to elevate the wheel upon movement of the vehicle.

GEORGE E. HUGHES.